United States Patent [19]
Gilmore et al.

[11] Patent Number: 4,795,892
[45] Date of Patent: Jan. 3, 1989

[54] PRE-PAID COMMODITY SYSTEM

[75] Inventors: Kevin J. Gilmore, Wheeling; Andrew H. Marrinson, Arlington Heights; William A. Jahnke, Schaumburg, all of Ill.

[73] Assignee: CIC Systems, Inc., Brentwood, Tenn.

[21] Appl. No.: 130,548

[22] Filed: Dec. 9, 1987

[51] Int. Cl.⁴ .............................................. G06F 7/08
[52] U.S. Cl. ..................................... 235/381; 235/472
[58] Field of Search ................................ 235/381, 472

[56] References Cited
U.S. PATENT DOCUMENTS 3,761,683  9/1973  Rogers .
3,990,558  11/1976  Ehrat .
4,004,089  1/1977  Richard et al. .
4,048,475  9/1977  Yoshida .
4,094,462  6/1978  Moschner .
4,211,919  7/1980  Ugon .
4,249,071  2/1981  Simjian .
4,629,874  12/1986  Pugsley et al. .
4,731,575  3/1988  Sloan .................................. 235/381

FOREIGN PATENT DOCUMENTS 0006498  6/1979  European Pat. Off. .
2802430  7/1978  Fed. Rep. of Germany .
2052219  1/1981  United Kingdom .

Primary Examiner—Harold I. Pitts
Attorney, Agent, or Firm—Hill, Van Santen, Steadman & Simpson

[57] ABSTRACT

The invention concerns a card activated prepayment and metering system for the sale of a utility service. Distributors are sold bulk sevice credits which they then resell in smaller quantities to individual customers. Customers are issued magnetic striped cards upon which information may be stored and from which information may be retrieved. Distributors issue credits on the cards which are later read by a customer's home terminal. Periodically, credit information is dumped from the distributor's terminal to a central computer. Similarly, audit information is periodically read and dumped from a customer's terminal to the central computer. The computer controls each customer's terminal through information broadcast over an FM transmitter, which is received by a receiver in each customer's terminal.

25 Claims, 8 Drawing Sheets

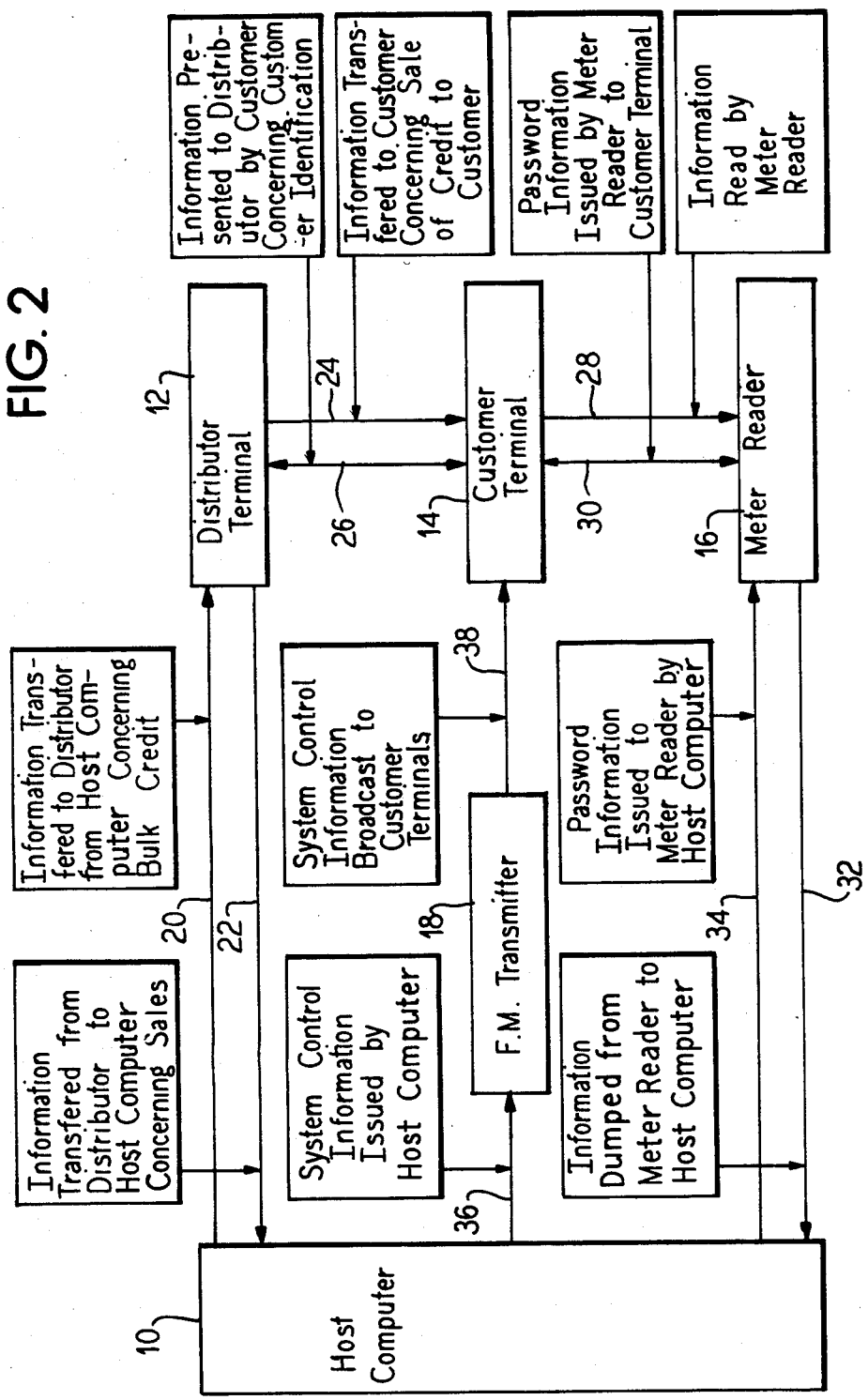

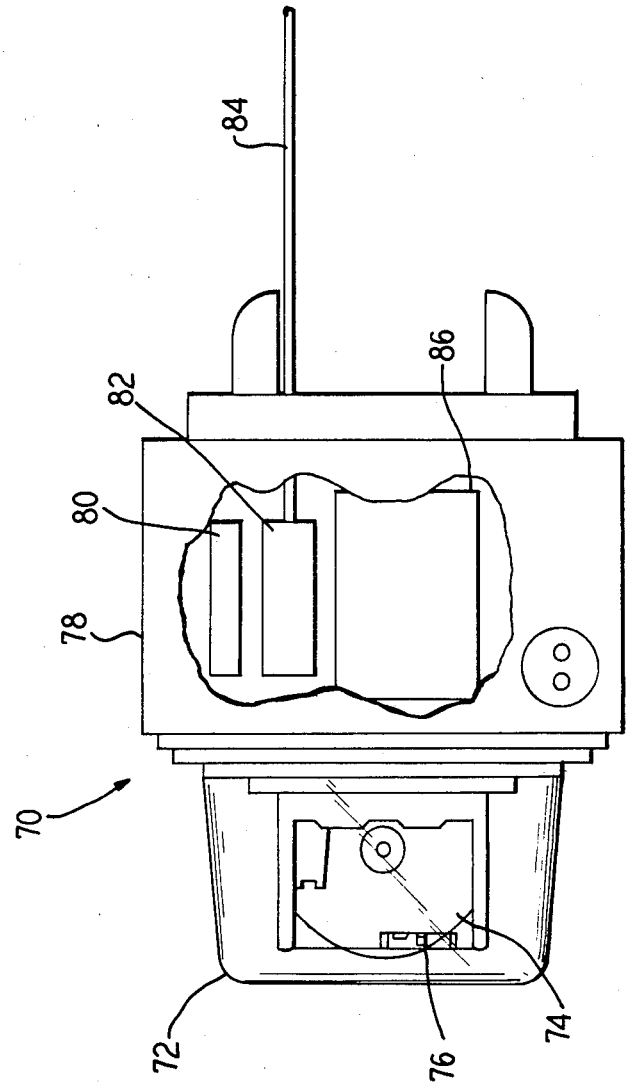

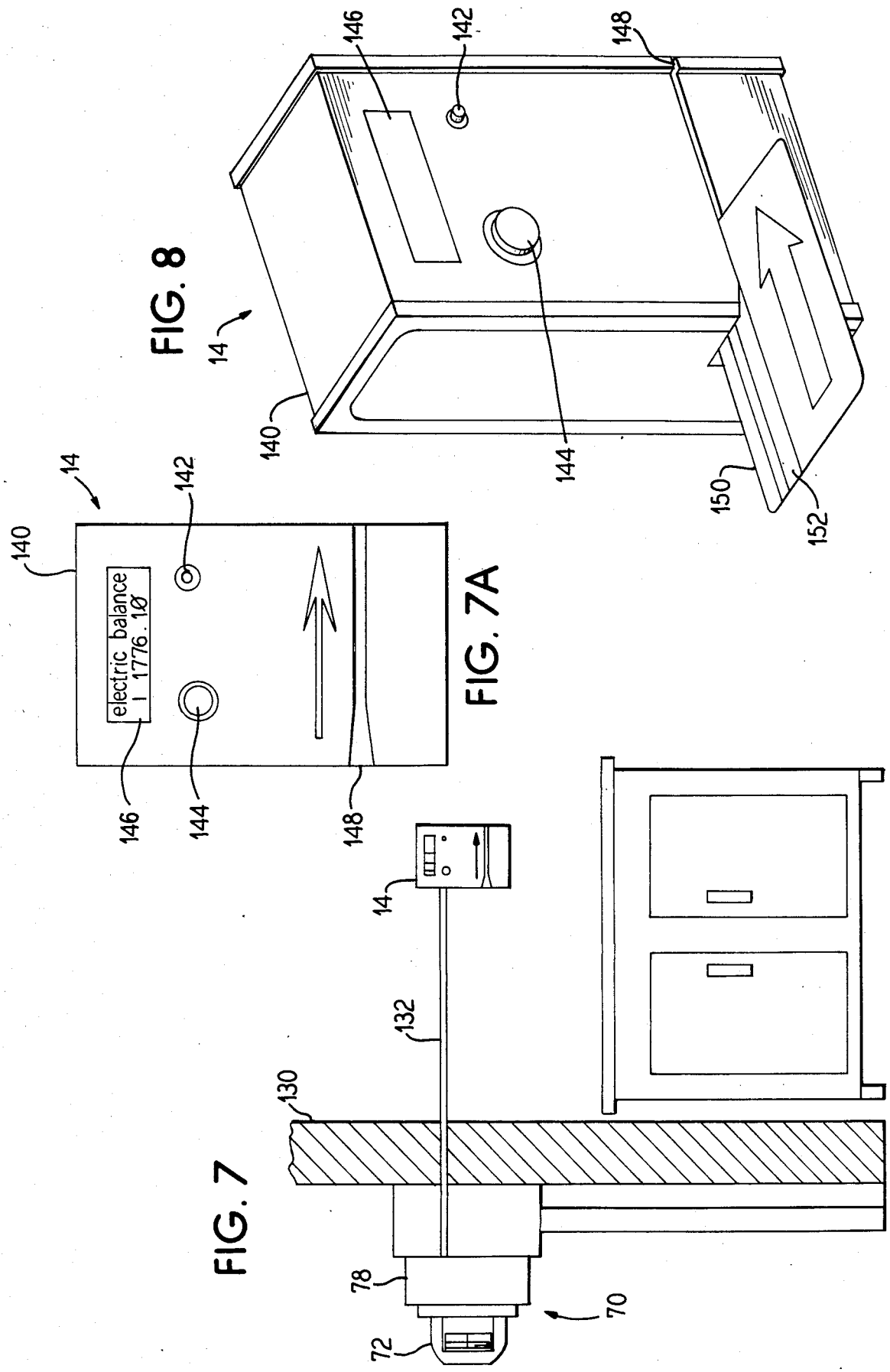

PRE-PAID COMMODITY SYSTEM

BACKGROUND OF THE INVENTION

1. Field of the Invention

The present invention relates generally to a payment and metering system for a commodity or utility service. Specifically, the invention concerns an improvement in a card activated method and apparatus for the pre-payment and metering such commodity or service.

2. Prior Art

A metering and payment system for a commodity or a utility service generally comprises the following: (a) meters; (b) meter readers; (c) transportation; (d) billing procedures and personnel; (e) collection procedures and personnel; and (f) billing mechanisms including computers and mailing machines. Over the years, the non-commodity related costs, such as mailing costs, personnel costs, etc., have escalated relative to commodity related costs such as power generation equipment, energy sources, light sources, etc. As a result, utilities and regulators have tried to control these costs. However, the technical ability to control these costs is almost non-existent.

Rather than change the entire system and make the system cost effective, inventors have attacked discrete elements of the system. A plethora of patents cover various devices for automatic and semi-automatic meter reading. But while meter reading costs may be high, the techniques employed, telephone use and RF transmission, have higher costs.

Furthermore, computer software was developed to improve billing and collection procedures. However, billing and collection costs were soon outstripped by increased labor and postage costs.

One way to control and/or reduce some of these costs is to require a consumer to prepay for the consumption of service or commodity. Systems for the prepayment of a commodity or a utility service are well known. The pay telephone is one example, while the location of a coin box on a gas meter is another example. Additionally, if home heating is done by wood, coal, oil or bottled gas, such energy is paid for before use. If lighting is done by solar energy, kerosene, wind generators or gas generators, it is also paid for before use.

U.S. Pat. No. 4,629,874 concerns a prepayment metering system. Therein is disclosed a card-activated prepayment metering system. The system uses a card on which information may be stored and erased and from which stored information may be read. A number recorded on the card is read at a meter and stored in preparation for the next card insertion. At that time, a credit is given. To obtain a further credit at the meter, the card is taken to a terminal station at which the number recorded on the card is read and is subjected to an encryption process using the a key, as is well known. The resulting encrypted number is recorded on the card in place of the previous number. On the next insertion of the card at the meter, the encrypted number is read from the card and subjected to an encryption step using the same key. The result of the encryption is compared with the number stored in the meter. If the result of the encryption and the number stored in the register match, a credit is issued.

To be successful, a pre-paid commodity or utility system must combine a number of integrated sub-systems. Since the vehicles that contain a pre-paid utility or commodity represent a valuable commodity, it is essential that each sub-system contain functional security measures. Such functional security measures are necessary to take into account the inherent unreliability factor of dealing with a public which is usually forced to purchase a service from a monopoly. Moreover, it is important for the system as a whole to have the ability to provide an audit trail that provides a final accounting for the entire system, both for the utility and utility regulators.

The meter reading systems to date ignore the inherent unreliability factor necessary in dealing with a public that usually is forced to deal with a monopoly. None of the pre-paid systems provide the all-important audit trail necessary in any utility system and to utility regulators.

SUMMARY OF THE INVENTION

The present invention combines all of the necessary ingredients for a complete pre-paid commodity or utility service system. Each transaction in the system is identified with a unique identification number. The system contains a number of sub-systems, each of which maintains processing information, to provide an audit trail. The information maintained by the sub-systems is fed to a central computer which performs a complete automated accounting of all transactions as they occurred throughout the entire system.

The present invention comprises four sub-systems: a host computer; a distributor terminal; a customer terminal; and a meter reading terminal. Together they form a closed loop system.

In the use of the system, a bulk amount of credit is issued or sold to a distributor. The distributor then sells smaller portions of credit to individual customers. Each customer then activates his or her unique commodity or utility service metering device in accordance with the issued credit. At routine intervals, a commodity or service provider may take individualized non-attrusive meter readings which are fed to a central computer to provide closed loop verification.

In the system, a host computer issues bulk credit to a distributor terminal by sending information over a modem link or on a magnetic storage medium. The information transferred consists of a unique distributor terminal identification number, a control number prefix and the value of the bulk credit. A customer, upon purchasing credit, pays the purchase price and hands a distributor such customer's magnetic card. The magnetic card is similar to the various types of plastic cards which contain a magnetic strip upon which information may be stored. The information on the customer's card comprises, at a minimum, the customer's service number.

Upon receiving the customer's pre-payment, the distributor stores certain information on the customer's card. This stored information comprises the distributor's terminal identification number, a transaction control number, the value of the customer's transaction, and the expiration date of the credit. The card is then returned to the customer.

With a card with newly stored information in his or her possession, the consumer may enter or download this information into a unique customer terminal attached to his or her metering device. Once the information has been downloaded to this terminal, that card cannot be used again unless reloaded upon a new purchase.

Once the information is loaded into the customer's terminal, the customer enjoys metered commodity or utility service to the extent of their authorized amount at their authorized rate. Additionally, the customer's terminal is provided with means for displaying information at the touch of a button. Such information includes the customer's consumption rate in units, the customer's consumption rate in dollars, and a warning of when to make new purchases. When the customer's prepaid credit is used up, the customer's terminal activates the customer's meter to shut off the commodity supply or utility service, unless overridden as discussed below.

There is also provided a meter reading terminal which comprises a small hand-held unit which can be used to nonintrusively extract information from the customer's terminal through a bidirectional optical interface. Periodically, for example, once a year, a meter reader utilizes the meter reading terminal to extract information, such as a customer's service number, distributor terminal identification numbers, control numbers used and the value of all of the customer's transactions. To access this information, the meter reader must use a password. Additionally, the meter reading terminal is capable of storing information for many customers and, therefore, may be used all day long before the extracted information is dumped to a host computer.

Once the meter reader has extracted the necessary information from any number of customer's terminals, the meter reader is taken back to the host computer to download the extracted information to the host computer. The host computer then compares the dumped information with its own data base to provide final verification.

Additionally, there is provided means for transmitting information directly from the host computer to a customer's terminal via FM radio wave transmission. The host computer broadcasts information over an FM transmitter. Information includes date and time, rate changes, invalid distributor terminal numbers, and invalid control numbers. That information is then received at the customer's meter by an FM receiver which translates the information into digital data for storage in the customer's terminal.

Hence, there is provided a closed loop system for the pre-payment and metering of a commodity or utility service and means for authorizing customer credits and for distributing such credits. There is also provided means for creating a comprehensive audit trail of all system transactions. Together, these features provide for functional security for and an appropriate accounting of the system.

Therefore, an aspect of the invention is a system for the pre-payment and metering of a commodity or a utility service which provides an audit trail of uniquely identified transactions.

Another aspect of the invention is a system for the pre-payment and metering of a commodity where billing is all but eliminated.

Yet another aspect of the invention is a system for the pre-payment and metering of a commodity or utility service where customers can purchase such commodity or utility service at convenient locations.

Yet a further aspect of the invention is a system for the pre-payment and metering of a commodity or utility service wherein meter reading transportation is all but eliminated.

Another aspect of the invention is a system for the pre-payment and metering of a commodity or utility service wherein meter reading can be virtually eliminated or used on an exception basis only.

These and other aspects of the invention will become more apparent by reference to the description of the preferred embodiments wherein the invention is described in more detail and the following drawings.

BRIEF DESCRIPTION OF THE DRAWINGS

FIG. 2 is an enhanced version of the block diagram of FIG. 1, further indicating the information transferred over each communication link;

FIG. 6 is a side view partially cut away of a meter used in connection with the system of FIG. 1;

FIG. 7 is a schematic diagram showing the communications connection between a meter and a customer terminal used in connection with a system embodying the principles of the instant invention;

FIG. 7a is a front elevational view of the customer terminal of FIG. 8;

FIG. 8 is a perspective view of a customer terminal used in a system embodying the priciples of the invention.

DESCRIPTION OF THE PREFERRED EMBODIMENTS

The system described below is preferably used in connection with the sale of electricity. Therefore, the system will be described in the context of the sale of electricity. However, with minor changes, as noted throughout the description, the system may also be used in connection with the sale of other services or commodities.

Figure 1:
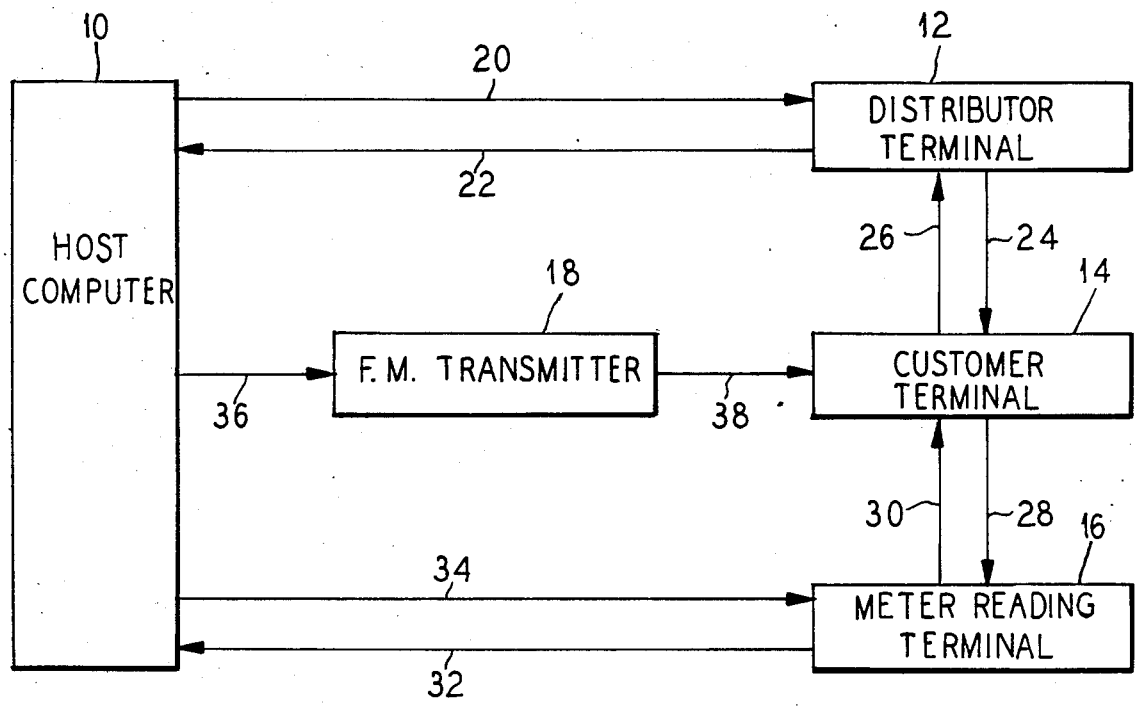
FIG. 1 is a block diagram showing the communication link of a system embodying the principles of the present invention.

In FIG. 1, there is shown in block diagram form the basic components of a system embodying the principles of the instant invention. There is provided a host computer 10, a distributor terminal 12, a customer terminal 14, a meter reading terminal 16 and an FM radio wave transmitter 18. While only one of each type of component has been shown, it will be appreciated that this is for illustration purposes only. A system in accordance with the invention normally comprises any number of distributor terminals, customer terminals and meter reading terminals. The term "host computer" is used to denote any type of computing facility, whether or not centralized and whether or not comprising a single computer.

The distributor terminal 12 is a device which reads and writes data on a plastic card with a magnetic strip. The distributor terminal 12 may be of any type commercially available but, preferably, is one such as a Magtek MT211. The distributor terminal 12 allows selected and authorized distributors to sell dollar credits or units of a commodity or a utility service, such as electricity.

The host computer terminal 10 and distributor terminal 12 communicate with each other over communication links 20 and 22. The communication links may be either telephone lines or some sort of transportable magnetic storage medium.

The distributor terminal 12 and a customer terminal 14 communicate with each other over communication links 24 and 26. These communication links comprise a plastic card with a magetic stripe, for example, a plastic credit or debit card.

A customer terminal 14 and a meter reading terminal 16 communicate over communication links 28 and 30. These communication links preferably comprise a bidirectional optical interface, but may also comprise hard wire plug-in connections.

The meter reading terminal 16 and the host computer 10 communicate over communication links 32 and 34. These communication links comprise a pair of plug-in connections, one each on the reading terminal 16 and the host computer 10, and all appropriate communications cable connected therebetween.

A final communications link is established between the host computer 10 and a customer terminal 14 through the FM transmitter 18. Information is sent from the host computer 10 to the FM transmitter over an appropriate communication link 36. This link will typically be a land line. The FM transmitter 18 then broadcasts an FM radio signal to establish communications link 38. Such FM signal is then received by an FM receiver in the customer's terminal.

In FIG. 2 there is shown the various types of information which are transmitted and received over the various communication links. A box for each communication link sets forth the information sent over that link. Such information will now be described.

In the operation of the system, a bulk amount of a commodity or utility service is transferred to a distributor in the form of a large dollar credit or a large number of units. To do this, the host computer sends a package of information to the distributor terminal. The package of information includes a distributor terminal identification number, a control number prefix and the value of the bulk transaction. A distributor then resells the commodity or utility service in smaller amounts. The distributor's terminal utilizes the information given to it by the host computer 10 to generate appropriate information for a given customer's magnetic stripe card.

Further in the operation of the system, an individual customer presents a magnetic striped card, as indicated by communication link 26, upon the purchase of an amount of a commodity or utility service. The distributor terminal reads a customer's service number from the card and stores it in its own memory. The distributor terminal then writes its distributor terminal identification number, a control number, the value of the transaction and the expiration date of the transaction onto the magnetic card so that it may be used in the customer's terminal. This writing process is indicated by the communication link 24. At this point, the customer now has an authorized card which may be used in his or her terminal, as will be described more fully below.

Periodically, or whenever a distributor obtains a new bulk transfer, the distributor transfers information relating to all of his or her transactions with customers to the host computer 10. Such information is sent back to the computer, as indicated by link 22 and includes a distributor's identification number, a terminal identification number, all of the individual customer service numbers used, all of the control numbers used, and the value of all of the transactions. This information will then be used by the host computer 10 for accounting purposes.

The customer takes the authorized card and inserts it into his or her home terminal to be read by such terminal. Upon reading of the card, the terminal stores the amount of credit authorized, the transaction control number and the distributor terminal number in its memory. The terminal then authorizes the meter to dispense utility or commodity services up to the amount of credit purchased.

Also, periodically, the customer's terminal 14 will be noninvasively read by the meter reading terminal 16. To do this, the meter reading terminal accesses a customer's terminal by transmitting a meter reading password to the customer terminal 14 over the bidirectional optical links, designated 28 and 30. Upon receipt of the password, the customer terminal 14 transmits information stored in the customer's terminal relating to all of the customer's transactions that have taken place since the last meter reading. Such information includes a customer's service number, a list of distributor terminal identification numbers, control numbers used, and the value of all of the transactions.

After several customer's terminals have been read, all of the information stored in the meter reading terminal 16 is then dumped to the host computer 10. The meter reading terminal 16 is connected directy to the host computer 10 and the host computer 10 issues its access password over link 34. Upon receipt of the access password, the meter reading terminal dumps, over link 32, all of the customer's service numbers, distributor terminal identification numbers, control numbers used and values of transactions contained within its memory. The host computer 10 then utilizes this inoormation to correlate system transactional information for accounting purposes.

The FM transmitter link is provided to allow for some flexibility in the system. To prevent fraud and theft and to provide the customer's terminal with rate change information, the FM transmitter link 38 is used to broadcast information to all customer terminals at one time. The information transmitted over the link 38 includes the broadcast date and time, rate changes, invalid distributor terminal numbers, and invalid customer control numbers. A customer's terminal will receive this information and react accordingly. For example, the customer's terminal will not accept the utility service or commodity credit issued by an invalid distributor terminal or one that contains an invalid customer control number. Furthermore, the consumption of credit will vary according to the rate set by utility.

Figure 3:
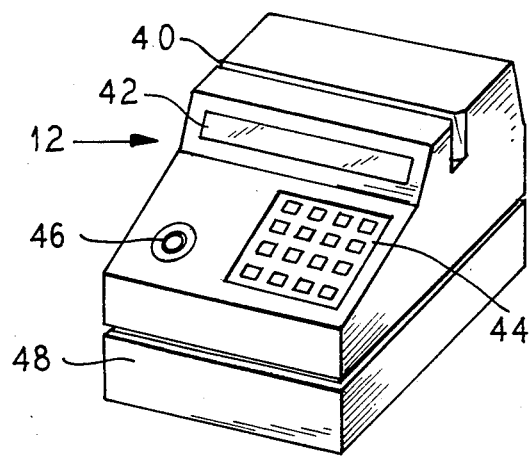
FIG. 3 is a perspective view of a distributor's terminal used in connection with a system embodying the principles of the invention.

A distributor terminal 12 is shown in FIG. 3. The distributor terminal 12 must be capable of reading a magnetic striped card nnd storing large amounts of information for transfer back to the host computer 10. The distributor terminal 12 may be ofany commercially available type, such as a Magtek MT211, which will allow selected and authorized distributors to sell dollar or unit amounts of a commodity or a utility service. The distributor terminal 12 includes a card reading slot 40, a display window 42, a keyboard 44, a security lock 46 and a mass storage and modem unit 48.

Figure 4:
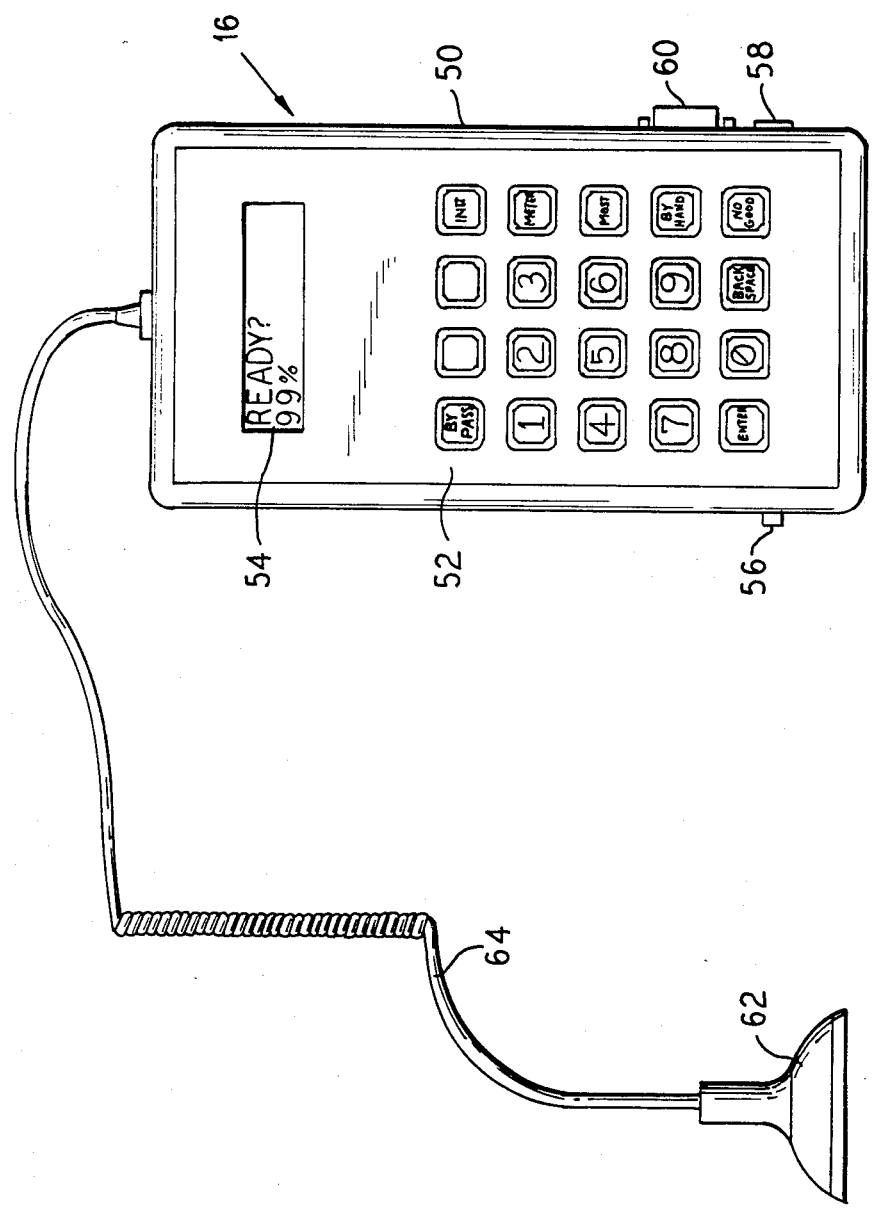
FIG. 4 is a front view of a meter reading terminal used in connection with a system embodying the principles of the invention.

A meter reading terminal 16 is shown in FIG. 4. It can be seen that the meter reading terminal 16 comprises a housing 50 with a keyboard 52 and a display window 54 located thereon. The terminal 16 also includes a power switch 56, a battery charging jack 58 and a host computer communications adaptor 60 for establishing a direct connection with the host computer 10. The customer communications adaptor 62 is coupled to the housing through cable 64. Customer meter communications adaptor 62 and cable 64 comprise optical links 28 and 30. The terminal 16 is small and light weight and, therefore, is portable. It may be used to read a large number of customer terminals before its data storage becomes full.

Figure 5:
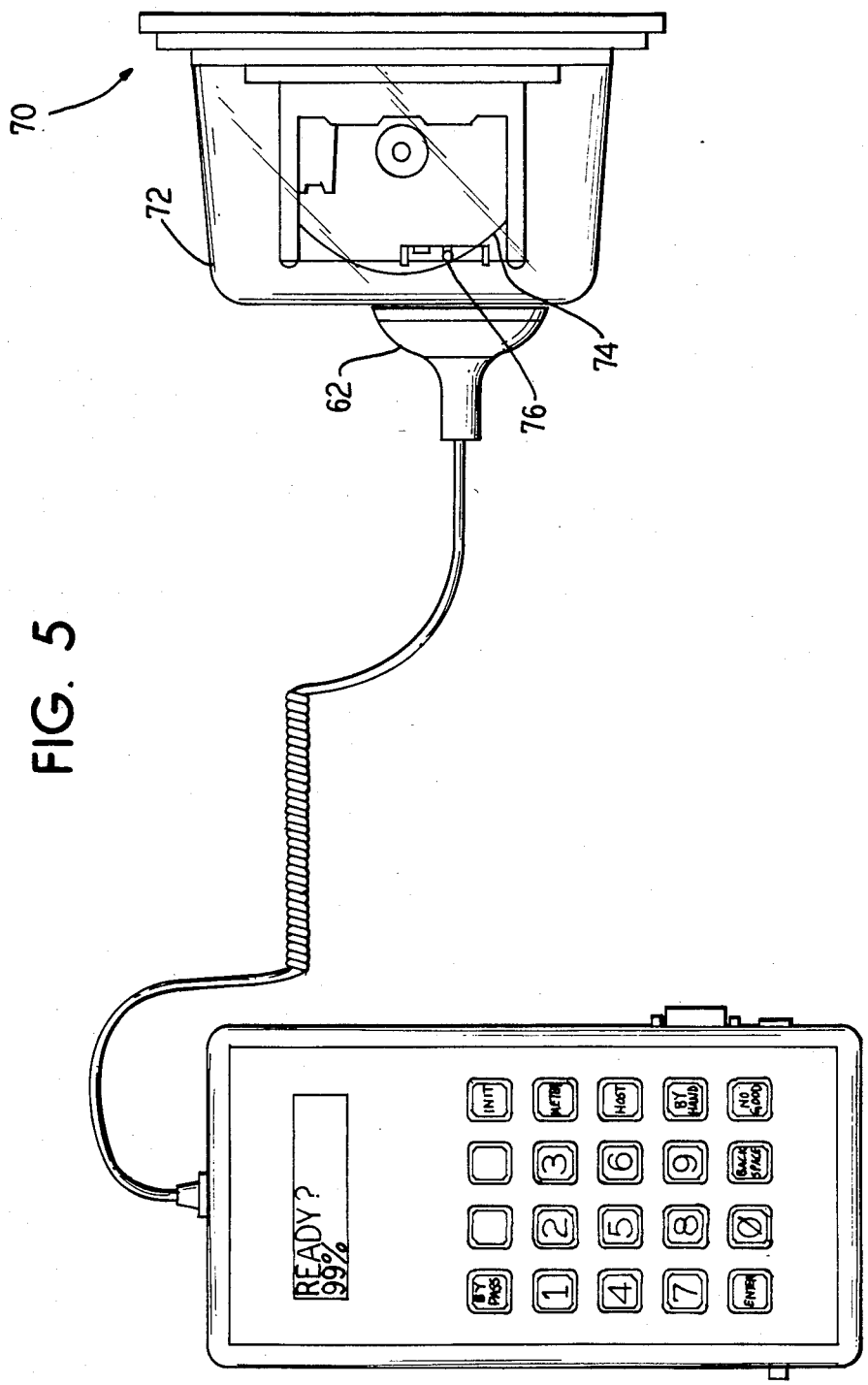
FIG. 5 is a view showing the use of the meter reading terminal of FIG. 4 in reading a meter.

In FIG. 5, the meter reading terminal 16 is shown in use reading a customer's terminal noninvasively. A customer's meter 70 is generally located outside of the customer's building. The meter 70 has a clear cover 72 in which the meter wheels are contained. The communications adaptor 62 is placed on top of this cover 72. The meter 70 has been modified to include optical sensor 76 for communications between the meter terminal 16 and the customer terminal 14.

In FIG. 6 the customer meter assembly 70 is shown in greater detail including modifications necessary to enable the use of existing customer meter assemblies with a system embodying the principles of the instant invention. The modifications include making changes within a switch housing 78. Such changes include providing FM receiver 80, security control microprocessor 82 and remote power switch 86. A data cable 84 forms a direct connection between a security control microprocessor 82 and the customer terminal 14.

Figure 6A:
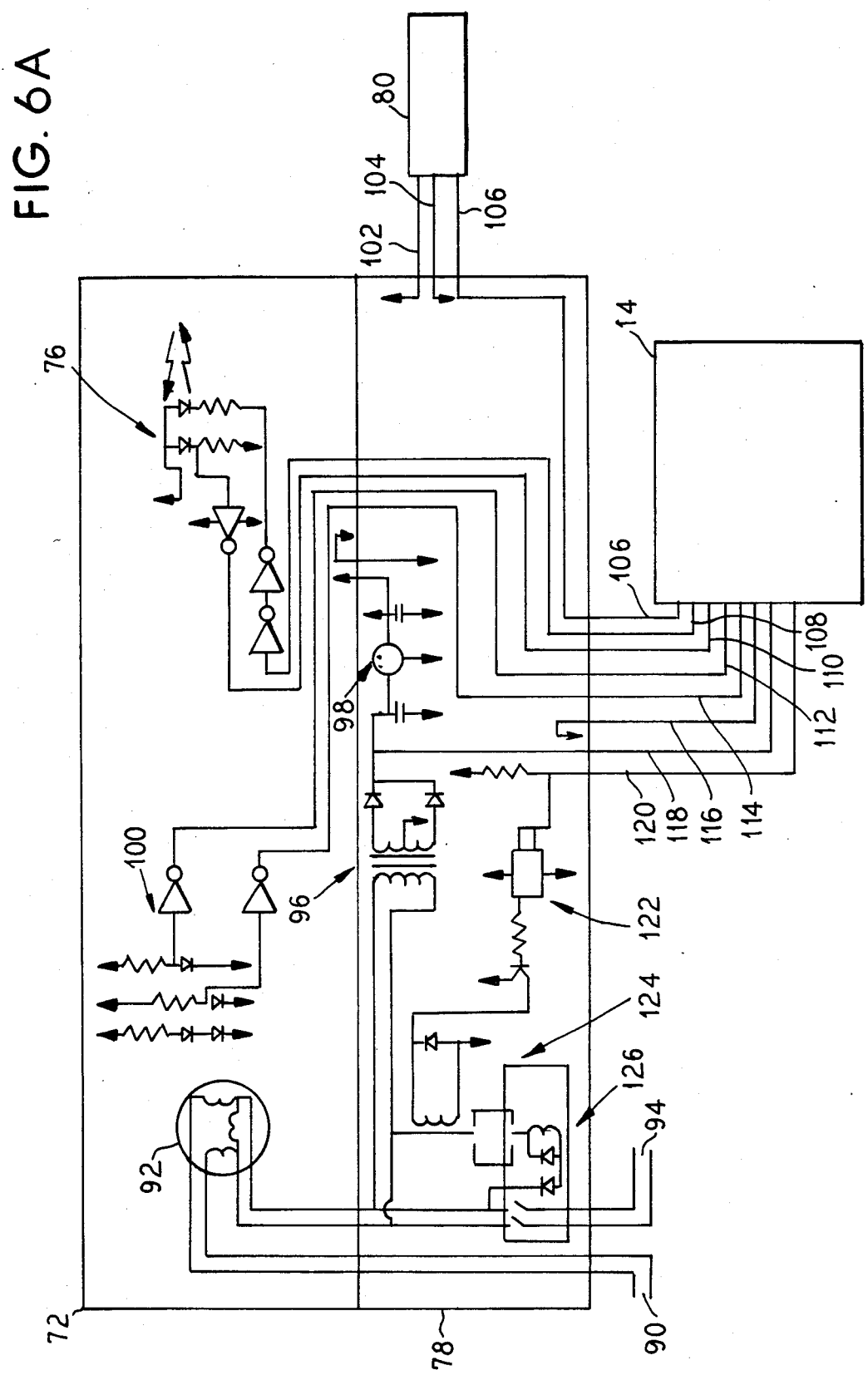
FIG. 6a is a schematic wiring diagram of the meter of FIG. 6.

In FIG. 6a, a wiring for a modified meter 70 is shown. The FM receiver 80 and the customer terminal 14 are shown in block diagram form, as they are shown in more detail in other Figures. In the preferred embodiment, power from an electric company enters a customer's meter through terminals 90. The power is then transformed down by transformer 92 to the required voltage. Typically, the voltage conversion is from 220 to 110 or 120 volts. This power is then available to the customer at terminals 94. However, if the system is not used to meter electric power usage, this voltage conversion step may be eliminated.

A second transformer 96 transforms the 120 volts down to 8 volts. The 8 volts is then regulated for use by the FM receiver 80 and various other electronic devices.

The modified wiring further includes optical inputs 100 which form a quadriture on the meter wheels. Upon rotation of a wheel, a digital pulse is sent to the customer's terminal. This distal pulse is then interpreted to determine how much service has been consumed and whether the wheels are turning in the correct direction.

The FM receiver 80 receives input power over line 102 and is grounded through line 104. The information received by the FM receiver 80 is transmitted to the customer terminal 14 as digital serial data over line 106.

When the customer's terminal is requested to send information to the meter reading terminal 16 through the bidirectional optical interface 76, such information is transmitted as digital serial data over line 108. On the other hand, when the meter reader 16 transmits its request for information to the customer terminal 14, such request is transmitted as digital serial data over line 110. Lines 112 and 114 carry the digital pulses of wheels 2 and 1, respectively, to a customer terminal 14. Line 118 connects the customer terminal 14 to the unregulated 8 volt power supply.

To enable a customer terminal to shut off a customer's power whenever the customer has failed to pre-pay for the service, a relay control signal is sent out over line 120 to the relay driver 122. The relay driver allows current to flow through the coil 124 as is well known in the art, which then pulls in the relay 126 to switch off a customer's power. However, if the system is being used in connection with the sale of a service or commodity other than electricity, the relay 126 may be used to turn power on or off to yet another device which shuts off such service or commodity.

FIG. 7 shows the physical wiring between a customer's meter 70 and a customer terminal 14. As can be seen, the customer's terminal 70 is located outside of a wall 130. A customer's terminal 14 is located inside. The two units are connected by data cable 132.

In FIGS. 7a and 8, a customer's terminal 14 is shown. As can be seen, the terminal 14 comprise a housing 140, a warning light 142, and a function button 144. A customer presses the function button to obtain information such as consumption rate in units or dollars, selecting when to be warned to make more purchases, and information concerning how to utilize the power or commodity to the best advantage. This information is displayed on the display 146. Such display is preferably of the LCD type, but any other appropriate display may be used. Finally, the terminal 14 includes the card reading slot 148 with a magnetic stripe reader.

In FIG. 8, the terminal 14 is shown in use reading a plastic card 150 with a magnetic stripe 152.

Figure 8A:
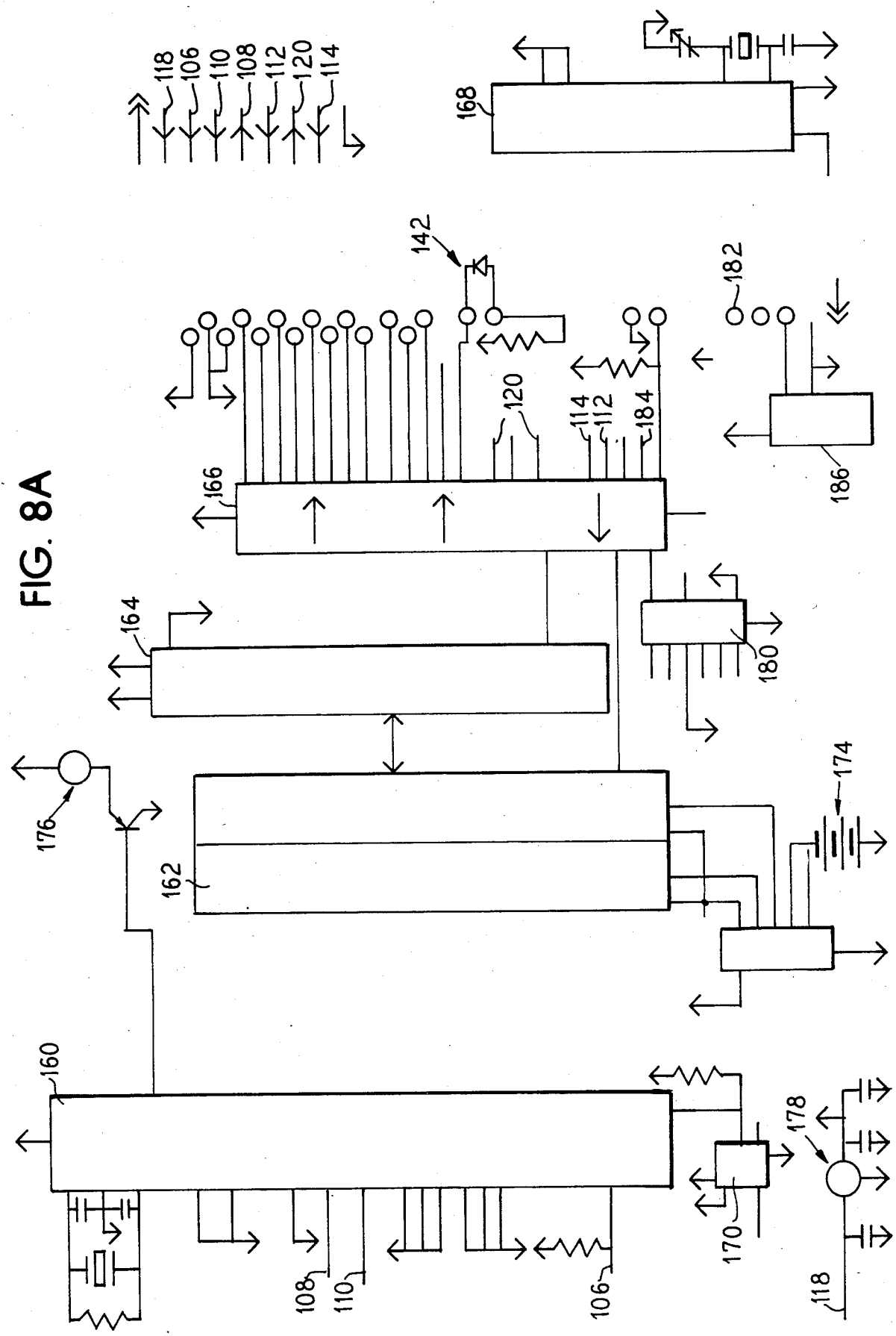
FIG. 8a is a terminal wiring diagram for the customer terminal of FIG. 8.

FIG. 8a is a circuit interface diagram showing the interfacing between all of the electronic components contained within the customer terminal 14 and any external connections. All components are standard, and only the connections necessary to explain the operation are shown. The electronic components include a microprocessor-direct memory access controller 160, memory chips 162 and 164, programmable interface 166, and battery backup clock 168. As can be seen, the information to be received or transmitted via the optiaal interface 76 is coupled directly to the microprocessor 160. The information received by the FM receiver 80 is also input into the microprocessor 160. The microprocessor is monitored by microprocessor monitor 170, as is well known in the art.

The microprocessor 160 and ram chips 162 and 164 and programmable interface 166 are all connected, as is well known in the art. Ram chip 162 is made nonvolatile by nonvolatile controller 172 and battery backup 174, as is well known in the art. The microporcessor 160 controls the operation of the customer terminal 14 by performing all housekeeping computations and checks.

A buzzer 176 is controlled by the microprocessor 160 in the event a person who cannot see must be warned that his or her credit is running low and that a new purchase should be made.

The unregulated voltage coming in over line 118 is regulated by voltage regulator 178 to produce a regulated 8 volt power supply. This power may then be used by the various components contained within a customer's terminal 14.

The programmable interface 166 is powered by voltage regulator 180, as is well known in the art. The programmable interface 166 interfaces between the microprocessor 160 and the wheels 100, the relay driver 122 and the magnetic stripe reader. The programmable interface 166 also drives the warning LED 142.

The magnetic stripe reader information is made available at terminal 182 and is input into the programmable interface at terminal 184. Flip-flop 186 is used to initiate an interrupt routine in the microprocessor 162 whenever a card is read, as is well known in the art.

The electronic circuitry for the FM receiver is standard, and is well known to those skilled in the art and need not be shown. The FM receiver is a narrow-band receiver and is designed in accordance with the principles well known in the art. The receiver utilizes a frequency-to-voltage convertor to convert the received radio signals into digital information. The receiver also utilizes the intermediate frequency FM amplifier, as is well known in the art. The remainder of the circuitry is typical of a narrow-band FM receiver and need not be described, as such a design is well known in the art.

It can be appreciated that the system described above prevents fraud on the system by providing for control over a customer's terminal by the utility through the radio wave broadcasts. Additionally, comprehensive accounting is provided by having each sub-component of the system store all information relating to transactions in which it is involved. Because all of the information stored is digital, it is easily utilized by the central computer when performing an accounting of the system.

Although various minor modifications may be suggested by those versed in the art, it should be understood that we wish to embody within the scope of the patent granted hereon, all such modifications as reasonably and properly come within the scope of our contribution to the art.

We claim:

1. A system for the prepayment, metering and auditing of a utility service available from a service source and supplied to consumers, said system comprising:
   central means for auditing all system transactions;
   means for transmitting distributor service credit information from said central means to a remote distributor;
   portable authorizing means unique for each consumer for retaining information enterable in said authorizing means relating to a purchase of a service credit by a consumer;
   a distributor terminal located at said remote distributor and including means for receiving said distributor service credit information from said means for transmitting and means for entering said information relating to a purchase of a service credit by a consumer in said authorizing means;
   a consumer terminal located at said consumer and connected to said service source, said consumer terminal including means for reading said service credit information from said authorizing means, means for storing said service credit information, and means responsive to selected inputs for enabling transmission to said consumer from said service source of an amount of said service equal in value to said service credit;
   an external meter means located at said consumer for monitoring usage of said service by said consumer, said meter means connected to said consumer terminal and having an information output;
   a meter reader inluding means non-invasively interfacing with said information output of said meter means for reading through said meter means, said usage of service by said consumer and the information stored in said means for storing in said consumer terminal, and means for storing the information read;
   means for transmitting the information read through said meter in said means for storing in said meter reader to said central means; and
   means for transmitting said selected inputs from said central means to said consumer terminal to alter the operation of said means for enabling.

2. A system as set forth in claim 1, further including means for transmitting information from said distributor terminal means to said central means.

3. A system as set forth in claim 2, wherein said means for transmitting said selected inputs from said central means to said consumer terminal comprises radio wave transmission.

4. A system as set forth in claim 3, wherein said means for transmitting said selected inputs from said central means to said customer means comprises an FM radio transmitter.

5. A system as set forth in claim 4, wherein said consumer terminal comprises means for receiving an FM radio signal.

6. A system as set forth in claim 5, wherein said FM radio signal is a narrow-band signal occupying a spectrum reserved for subcarriers by the Federal Communications Commission.

7. A system as set forth in claim 1, wherein said meter reader comprises a bidirectional optical interface.

8. A system as set forth in claim 1, wherein said authorizing means comprises a card including a magnetic stripe.

9. A system as set forth in claim 8, wherein said consumer terminal comprises a magnetic stripe reader.

10. A system as set forth in claim 9, wherein said consumer terminal further comprises means for displaying information and means for warning a consumer that a prepaid purchase is nearly expended.

11. A system as set forth in claim 3, wherein said central means may selectively transmit selected inputs to any number of consumer terminals.

12. A system as set forth in claim 11, wherein said central means may control a consumer terminal by way of said selected inputs transmitted over a radio wave.

13. A system as set forth in claim 12, wherein said central means may remotely turn said consumer's utility service on or off, and change said consumer's consumption rate of said utility service credit through said control means.

14. A method for the prepayment, metering and auditing of a utility service available from a service source and supplied to consumers, said method comprising the following steps:
   (a) transmitting distributor service credit information from central means for auditing all system transactions to a remote distributor;
   (b) receiving said distributor service credit information from said central means;
   (c) entering information relating to a purchase of a service credit by a consumer in an authorizing means unique to said consumer for retaining said information;
   (d) reading said information in said authorizing means with a consumer terminal with means for reading said service credit information from said authorizing means;
   (e) storing said service credit in said consumer terminal;
   (f) enabling transmission of service from said service source of an amount of said service equal in value to said service credit in response to selected inputs;

(g) monitoring usage of said service by said consumer with a meter with an information output;

(h) non-invasively interfacing with said information output of said meter with a meter reader and reading through said meter said usage of said service and said information stored in said consumer terminal;

(i) storing the information read through said meter in said meter reader;

(j) transmitting said information stored in said meter reader to said central means;

(k) transmitting selected inputs from said central means to said consumer terminal; and (l) auditing all system transactions.

15. A method according to claim 14, further including a step of transmitting information about said consumer purchase of a service credit from said remote distributor to said central means.

16. A method as set forth in claim 15, wherein said step of transmitting selected inputs from said central means to a consumer terminal controls use of said utility service by turning said service on or off and varying utility service credit consumption rates.

17. A method as set forth in claim 16, wherein said step of transmitting selected inputs from said central means to said consumer terminal includes transmitting said information from said central means to said consumer terminal over radio waves.

18. A method as set forth in claim 17, wherein said radio waves are narrow-band FM radio waves.

19. A method as set forth in claim 15, wherein said step of transmitting distributor service credit information comprises transmitting information including a remote distributor terminal identification number, a value for said quantity of utility service credit and a control number prefix.

20. A method as set forth in claim 19, wherein said step of entering information relating to a purchase of a credit by a consumer comprises a transaction wherein a consumer presents a unique authorizing means with a consumer service number stored thereon and wherein said authorizing means is returned to said consumer upon purchase of a utility service credit with further information stored thereon including a remote distributor terminal identification number, a transaction control number, a value for said transaction and an expiration date for said authorizing means.

21. A method as set forth in claim 20, wherein said information transmitted from said remote distributor to said central means includes a remote distributor terminal identification number, consumer service numbers, control numbers used by said remote distributor and values for all sale step transactions.

22. A method as set forth in claim 16, wherein said information transmitted during said step of transmitting selected inputs from said central means to said consumer terminal includes a transmission date and a transmission time, a utility service rate, invalid remote distributor terminal identification numbers and invalid control numbers.

23. A method as set forth in claim 14, wherein said step of non-invasively reading through said meter with said meter reader reading step comprises reading through a bidirectional interface.

24. A system for the prepayment, metering and auditing of a utility service available from a service source and supplied to consumers, said system comprising:

central means for auditing all system transactions;

means for transmitting distributor service credit information from said central means to a remote distributor;

portable authorizing means unique for each consumer for retaining information enterable in said authorizing means relating to a purchase of a service credit by a consumer;

a distributor terminal located at said remote distributor and including means for receiving said distributor service credit information from said means for transmitting and means for entering said information relating to a purchase of a service credit by a consumer in said authorizing means;

a consumer terminal located at said consumer and connected to said service source, said consumer terminal including means for reading said service credit information from said authorizing means, means for storing said service credit information, and means responsive to selected inputs for enabling transmission to said consumer from said service source of an amount of said service equal in value to said service credit;

an external meter means located at said consumer for monitoring usage of said service by said consumer, said meter means connected to said consumer terminal and having an information output;

a meter reader including means non-invasively interfacing with said information output of said meter means for reading through said meter means, said usage of service by said consumer and the information stored in said means for storing in said consumer terminal, and means for storing the information read; and means for transmitting the information read through said meter in said means for storing in said meter reader to said central means.

25. A method for the prepayment, metering and auditing of a utility service available from a service source and supplied to consumers, said method comprising the following steps:

(a) transmitting distributor service credit information means for auditing all system transactions to a remote distributor;

(b) receiving said distributor service credit information from said central means;

(c) entering information relating to a purchase of a service credit by a consumer in an authorizing means unique to said consumer for retaining said information;

(d) reading said information in said authorizing means with a consumer terminal with means for reading said service credit information from said authorizing means;

(e) storing said service credit on said consumer terminal;

(f) enabling transmission of service from said service source of an amount of said service equal in value to said service credit in response to selected inputs;

(g) monitoring usage of said service by said consumer with a meter with an information output;

(h) non-invasively interfacing with said information output of said meter with a meter reader and reading through said meter, said usage of said service and said information stored in said consumer terminal;

(i) storing the information read through said meter in said meter reader;

(j) transmitting said information stored in said meter reader to said central means; and (k) auditing all system transactions.

* * * * *